US012419467B2

(12) United States Patent
Poruks et al.

(10) Patent No.: US 12,419,467 B2
(45) Date of Patent: Sep. 23, 2025

(54) END OF ARM TOOL FOR ROBOTIC COOKING SYSTEM

(71) Applicant: ROBOEATZ, SIA, Riga (LV)

(72) Inventors: Janis Poruks, Riga (LV); Konstantins Korcjomkins, Riga (LV)

(73) Assignee: Sia Roboeatz, Riga (LV)

( * ) Notice: Subject to any disclaimer, the term of this patent is extended or adjusted under 35 U.S.C. 154(b) by 720 days.

(21) Appl. No.: 17/765,991

(22) PCT Filed: Sep. 29, 2020

(86) PCT No.: PCT/LV2020/050005
§ 371 (c)(1),
(2) Date: Apr. 1, 2022

(87) PCT Pub. No.: WO2021/066638
PCT Pub. Date: Apr. 8, 2021

(65) Prior Publication Data
US 2022/0369676 A1    Nov. 24, 2022

(30) Foreign Application Priority Data

Oct. 3, 2019  (LV) ........................................ P-19-52

(51) Int. Cl.
*A23L 5/00*      (2016.01)
*A47J 27/00*    (2006.01)
(Continued)

(52) U.S. Cl.
CPC ................. *A47J 44/00* (2013.01); *A23L 5/00* (2016.08); *A47J 27/004* (2013.01); *B25J 11/0045* (2013.01); *B25J 15/04* (2013.01)

(58) Field of Classification Search
CPC .. B25J 11/0045; B25J 15/0052; B25J 9/1612; B25J 9/0009; B25J 15/0253; B25J 11/00;
(Continued)

(56) References Cited

U.S. PATENT DOCUMENTS 3,944,335 A * 3/1976 Saito ....................... G02F 1/116
                                                          359/313
4,565,400 A * 1/1986 Nakashima .......... B25J 15/0213
                                                          294/197
(Continued)

FOREIGN PATENT DOCUMENTS

CN        202858799 U       4/2013
GB          2521999 A         7/2015
WO   WO-2019026027 A1 *  2/2019 .............. A47J 43/04

OTHER PUBLICATIONS

International Search Report for PCT/LV2020/050005, Prepared by the European Patent Office, Mailing date Jan. 14, 2021 5 pages.

*Primary Examiner* — Jimmy Chou
(74) *Attorney, Agent, or Firm* — Brooks Kushman P.C.

(57) ABSTRACT

An end of arm tool for robotic cooking system having: a rotary actuator, a flexible coupling, a linear actuator, a gripper operably connected with the linear actuator and designed to releasably grip an object. The flexible coupling is connected with the rotary actuator and releasably engaging an engagement means of a plurality of the containers for holding a supply of an ingredient. The flexible coupling is designed to compensate misalignment and/or ensure easy entering of the engaging part of the flexible coupling to the corresponding engagement means of the plurality of the containers. The gripper comprising two rods associated with load cells, providing a representation of a load on the gripper; each rod is provided with a ledge having one or more recesses, designed to accommodate an object gripped; the rods are provided with heads, to engage with cavities on a container for holding a supply of an ingredient.

9 Claims, 4 Drawing Sheets

(51) Int. Cl.
*A47J 44/00* (2006.01)
*B25J 11/00* (2006.01)
*B25J 15/04* (2006.01)

(58) Field of Classification Search
CPC .... B25J 15/0019; B25J 15/0033; B25J 15/00;
B25J 15/0066; B25J 15/0047; B25J
15/0071; B25J 15/009; B25J 19/0083;
B25J 19/0091; Y10S 901/45; Y10S
901/50; A47J 44/00; A47J 27/00; B65G
47/90; F16L 37/00; F16L 37/121; F16L
37/1205; F16L 37/0987; F16L 15/08;
F16L 33/00; F16L 37/086; F16L 39/00;
F16L 41/001; B29C 45/2727
USPC ........ 294/902; 414/751, 731, 741, 814, 222;
99/280, 325
See application file for complete search history.

(56) References Cited

U.S. PATENT DOCUMENTS

| | | | | |
|---|---|---|---|---|
| 5,131,706 | A * | 7/1992 | Appleberry | B25J 15/04 294/119.1 |
| 5,197,846 | A | 3/1993 | Uno et al. | |
| 5,340,949 | A * | 8/1994 | Fujimura | G01G 17/04 426/231 |
| 5,342,098 | A * | 8/1994 | Wilkins | F16L 37/56 285/309 |
| 5,386,102 | A | 1/1995 | Takikawa et al. | |
| 7,174,830 | B1 * | 2/2007 | Dong | B25J 9/0087 99/348 |
| 7,570,358 | B2 * | 8/2009 | Den Boef | G01N 21/956 356/326 |
| 8,276,505 | B2 * | 10/2012 | Buehler | A47J 44/00 99/348 |
| 8,820,219 | B2 | 9/2014 | Buehler | |
| 8,848,281 | B2 * | 9/2014 | Sakurai | G02F 1/3534 359/328 |
| 8,989,893 | B2 * | 3/2015 | Jones | A23G 9/22 221/24 |
| 9,131,807 | B2 * | 9/2015 | Roy | A47J 44/00 |
| 10,154,762 | B2 | 12/2018 | Farid et al. | |
| 10,455,987 | B1 | 10/2019 | He | |
| 11,167,421 | B2 * | 11/2021 | Sinnet | B25J 15/08 |
| 2002/0191264 | A1 * | 12/2002 | Vernackt | G02F 1/11 359/237 |
| 2005/0193901 | A1 * | 9/2005 | Buehler | A23L 5/10 99/468 |
| 2013/0154293 | A1 | 6/2013 | De Koning | |
| 2014/0142751 | A1 * | 5/2014 | Takizawa | B25J 9/0093 700/245 |
| 2015/0013550 | A1 * | 1/2015 | Lin | A47J 37/04 99/404 |
| 2018/0070776 | A1 | 3/2018 | Ganninger | |
| 2018/0132649 | A1 * | 5/2018 | He | B65B 43/16 |
| 2018/0249861 | A1 * | 9/2018 | Hiatt | A47J 36/00 |
| 2019/0069722 | A1 * | 3/2019 | He | A47J 37/1228 |
| 2019/0091877 | A1 * | 3/2019 | Park | B25J 19/02 |
| 2019/0125126 | A1 | 5/2019 | Cohen | |
| 2019/0176338 | A1 * | 6/2019 | Zito | G06Q 50/12 |
| 2019/0256301 | A1 * | 8/2019 | Hashimoto | B25J 15/04 |
| 2020/0160463 | A1 * | 5/2020 | He | B25J 11/00 |
| 2022/0118605 | A1 * | 4/2022 | Ishizu | B25J 9/0096 |
| 2022/0161417 | A1 * | 5/2022 | Watt | B25J 11/0045 |

* cited by examiner

END OF ARM TOOL FOR ROBOTIC COOKING SYSTEM

CROSS-REFERENCE TO RELATED APPLICATION

This application is the U.S. national phase of PCT Application No. PCT/LV2020/050005 filed on Sep. 29, 2020, which claims priority to LV Patent Application No. P-19-52 filed on Oct. 3, 2019, the disclosures of which are incorporated in their entirety by reference herein.

TECHNICAL FIELD

The invention relates to automatic cooking devices and systems, in particular, robotic systems for preparing meals, more particular, to an end of arm tool for robotic cooking system.

BACKGROUND ART

Ready-made meal manufacturers, fast-food restaurants and catering services providers are facing tightening margins and increased demand for flexibility and food safety. Robotic cooking systems become a solution for such growing demands.

There is known a robotic cooking system (U.S. Pat. No. 7,174,830 B1), comprising one or more robots having means to move food containers between multiple positions and means to stir food within a cooking pan, a food storage and selection area, a cooking area within a range of motion of the robot, at least one food container containing food ingredients and a loading conveyor to move the food container to the cooking area; the robot is configured to move food ingredients from the loading conveyor into a cooking pan, held by the robot in a position over a cooking element in the cooking area. The robot uses the means to move food containers to unload food into a serving dish, which is moved by a conveyor to a serving area.

There is known a conception of a food preparation system (U.S. Pat. No. 8,276,505 B2), comprising a housing comprising a wall; a control subsystem configured to control a plurality of food preparation processes capable of preparing a meal comprising a variety of foods based on user selection of the foods; plurality of ingredient storage containers comprising dry ingredient storage containers and liquid ingredient storage containers; a storage module configured to store the ingredient storage containers and a variety of ingredients contained within the ingredient storage containers for an extended period; an ingredient manipulator configured to access and remove a plurality of ingredients from the ingredient storage containers, as commanded by the control subsystem; a cooking receptacle disposed within the housing, the cooking receptacle being configured to cook ingredients placed therein by the ingredient manipulator; a dish and food transfer area; and a cleaning subsystem configured to clean the cooking receptacle and the surface of the wall of the housing.

There is known a conception of a food preparation system (U.S. Pat. No. 8,820,219 B2), comprising i.a. an automated primary manipulator configured to move and manipulate food ingredients and dishware, the automated primary manipulator is further configured to place food on dishes and to move dishware that has been returned by a user from the user access area to the dish washing area.

Although the prior art solutions partially solve the problem, their effectiveness is still relatively insufficient. Also, some of the cited document do not contain sufficient enabling disclosure.

SUMMARY OF INVENTION

The invention provides an end of arm tool for robotic cooking system, comprising: a rotary actuator, a flexible coupling, a linear actuator, a gripper operably connected with the linear actuator and designed to releasably grip an object, such as a tray, a container, a dish, or a plate. The flexible coupling is operably connected with the rotary actuator and is adapted to be releasably engaged with an engagement means of a plurality of the containers for holding a supply of an ingredient, so that at the engaged position the rotation of the flexible coupling causes rotation of a corresponding engagement means of such elements of the robotic cooking system as the plurality of the containers and/or washing nozzle of a washing subsystem. The flexible coupling is designed to compensate misalignment and/or ensure easy entering of the engaging part of the flexible coupling to the corresponding engagement means of the plurality of the containers.

The gripper comprises two rods, directly or indirectly associated with load cells, adapted to provide a representation of a load on the gripper. Each rod is further provided with a ledge having one or more recesses, designed to accommodate an object gripped by the gripper. The rods are further provided with heads, designed to be engaged with cavities of the respective shape on a container for holding a supply of an ingredient.

The end of arm tool is further provided with one or more air nozzles directed so to create air flow paths along the inner surface of a tray (to be releasably gripped and held by the rods of the gripper) towards a discharge edge of the tray and thus, to facilitate discharging food ingredients from the tray.

The end of arm tool may further comprise a male or female part of a pneumatic channel coupling, configured to supply pressurized air, comprising a plurality of pneumatic supply lines. The pneumatic coupling configured to couple and uncouple the plurality of pneumatic receiving lines on a female part from the plurality of pneumatic supply lines on the male part, the pneumatic coupling including a housing, a plurality of supply line fittings configured to receive the plurality of pneumatic supply lines, a plurality of receiving line fittings configured to receive the plurality of pneumatic receiving lines. The male or female part of the pneumatic channel coupling may further comprise a spring system, adapted to compensate some misalignment in the male and female parts of the pneumatic channel coupling during their coupling.

The male or female part of the pneumatic channel coupling may further comprise one or more guiding rods adapted to be accommodated in the respective recesses in the other part of the coupling.

DETAILED DESCRIPTION OF INVENTION

Figure 1:
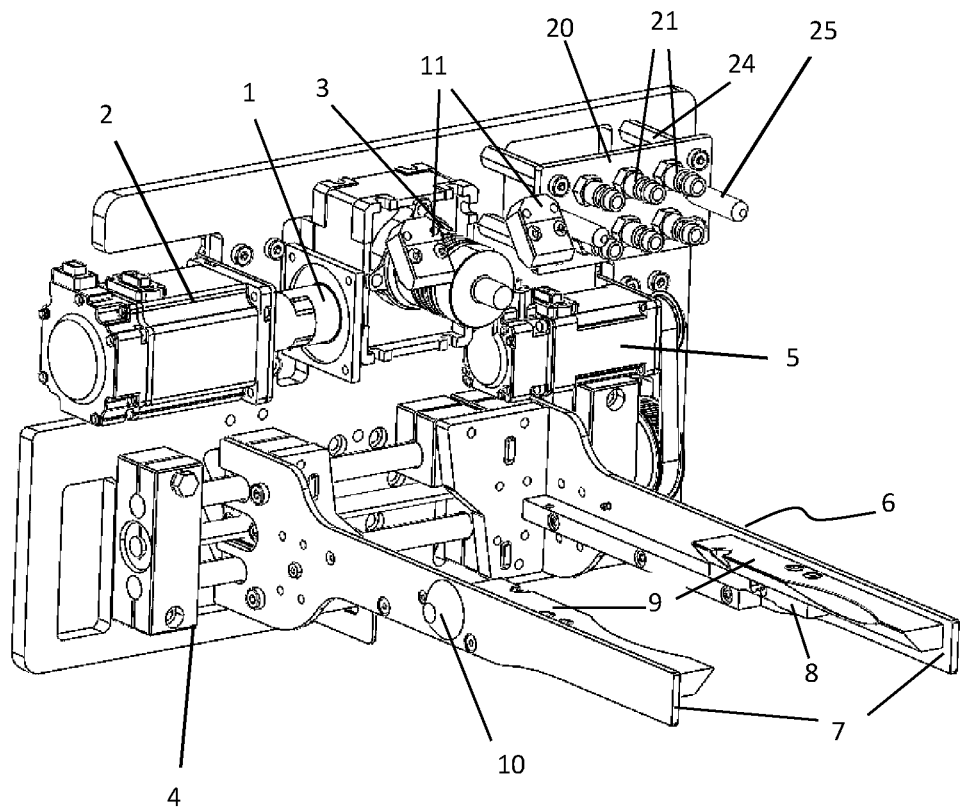
FIG. 1 shows one embodiment of the end of arm tool.
Figure 2:
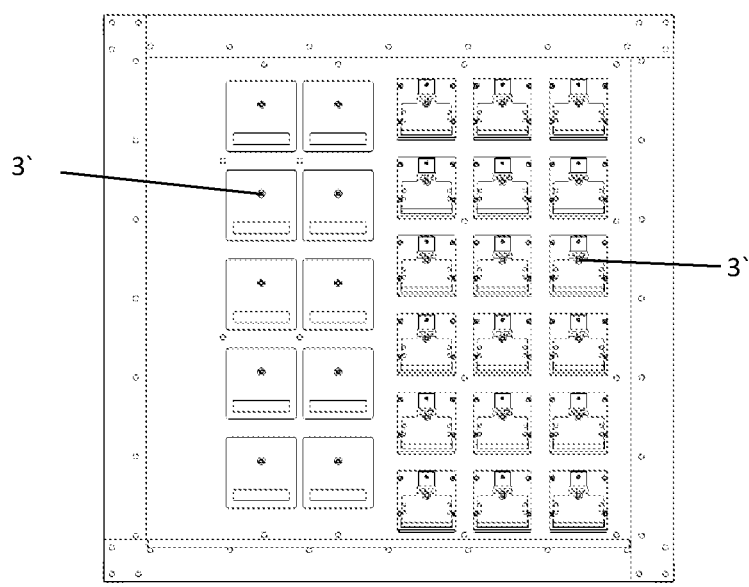
FIG. 2—is a frontal view of the plurality of containers for holding a supply of ingredients.

The proposed robotic end of arm tool (FIG. 1) for robotic cooking system, comprising: a rotary actuator 1, operably connected with a first motor 2; a flexible coupling 3; a linear actuator 4, operably connected with a second motor 5; a gripper 6, operably connected with the linear actuator 4 and designed to releasably grip and hold an object, such as a tray, a container (e.g. holding a supply of an ingredient), a dish, or a plate. The flexible coupling 3 is operably connected with the rotary actuator 1 and is adapted to be releasably engaged with an engagement means 3' of a plurality of the containers for holding a supply of an ingredient (FIG. 2), so that at the engaged position the rotation of the flexible coupling 3 causes rotation of a corresponding engagement means 3' of such elements of the robotic cooking system as the plurality of the containers and/or washing nozzle of a washing subsystem. The flexible coupling 3 is designed to compensate misalignment and/or ensure easy entering of the engaging part of the flexible coupling 3 to the corresponding engagement means of the plurality of the containers. The flexible coupling 3 can be in the form of bellow coupling, beam coupling, jaw coupling, Oldham coupling and other type.

Figure 3:
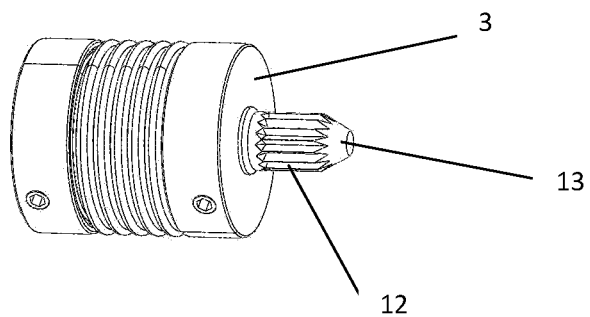
FIG. 3—is a perspective view of one embodiment of the engaging part of the flexible coupling, which is adapted to be engaged with an engagement means of a plurality of containers.

According to the preferred embodiment, the engaging part 12 of the flexible coupling 3 (FIG. 3), which is adapted to be engaged with an engagement means 3' of a plurality of containers is provided with cogs or equivalent means to facilitate engagement with respective engaging surfaces of the engagement means 3' of a plurality of containers. The engaging part 12 of the flexible coupling 3 preferably has a tip 13, which is substantially of truncated cone shape. However, the tip 13 can be also of a truncated pyramid or other shape having slant surface. The preferred angle between the imaginary longitudinal axis of symmetry of the flexible coupling 3 and the slant surface of the tip 13 is from 30 to 60 degrees.

The gripper 6 comprises two rods 7, which are directly or indirectly associated with load cells 8, adapted to provide a representation (e.g. digital) of a load on the gripper 6. Each rod 7 is further provided with a ledge 9 having one or more recesses (27), designed to accommodate an object gripped and held by the gripper 6 (i.e. having the shape, corresponding to the segment of an external part of an object to be gripped).

The rods 7 are further provided with heads 10, designed to be engaged with cavities of the respective shape on a container for holding a supply of an ingredient. According to the preferred embodiment the heads 10 may have a conical shape or a shape of a truncated cone.

Figure 4:
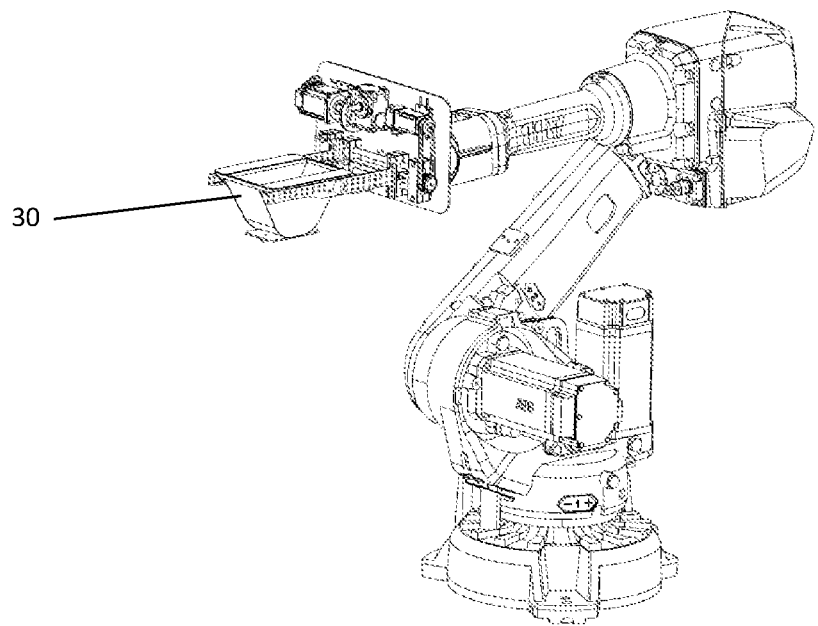
FIG. 4—a perspective view of the robotic arm with end of arm tool, holding a tray.

According to yet another embodiment the end of arm tool is further provided with one or more air nozzles 11 (FIG. 1) directed towards the inner part of a tray 30 (the tray 30 to be releasably gripped and held by the rods 7 of the gripper 6-FIG. 4), so to create air flow along the surface of the tray 30 towards a discharge edge of the tray 30 to facilitate discharging food ingredients from the tray 30.

Figure 5:
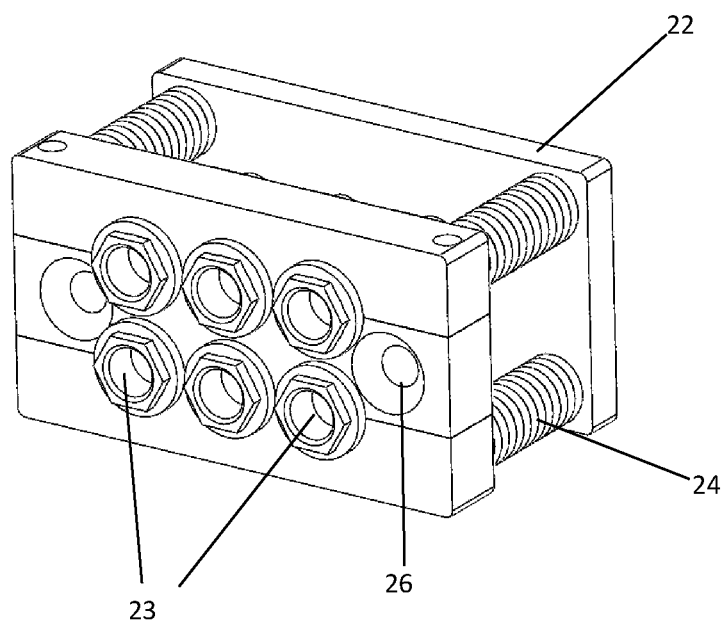
FIG. 5—a perspective view of a female part of the pneumatic channel coupling.

The end of arm tool may further comprise a male part 20 of a pneumatic channel coupling (FIG. 1), configured to supply pressurized air, comprising a plurality of pneumatic supply lines 21. The pneumatic coupling configured to couple and uncouple the plurality of pneumatic receiving lines 23 on a female part 22 (FIG. 5) from the plurality of pneumatic supply lines 21 on the male part 20. The female part 22 comprising a plurality of pneumatic receiving lines configured to receive pressurized air from the plurality of pneumatic supply lines 21. The pneumatic coupling including a housing, a plurality of supply line fittings 28 configured to receive the plurality of pneumatic supply lines 21, a plurality of receiving line fittings 29 configured to receive the plurality of pneumatic receiving lines 23. The pneumatic receiving lines 23 are designed to be able to supply compressed air independently one from another.

According to the preferred embodiment the male part 20 and/or the female part 22 of the pneumatic channel coupling further comprises a spring system 24, adapted to compensate some misalignment in the male 20 and female 22 parts of the pneumatic channel coupling during their docking. The spring system 24 may comprise a base support 32 (which can be a housing or a frame of the end of arm tool or a housing or a frame of a container or a dispenser) and a head 33, wherein the head 33 is pivotably mounted on the base support 32; a spring system provided between the base support 32 and the head 33; wherein the head 33 is pivotable about the base support 32 and has six degrees of freedom, which however are limited by springs used. The ends of pneumatic supply lines 21 and/or pneumatic receiving lines 23 are mounted in or on the head 33, where flexible hoses are used for the pneumatic channels at least between the base support 32 and the head 33 to ensure the required degrees of freedoms of the head.

Also, the male part 20 or the female part 22 of the pneumatic channel coupling may comprise one or more guiding rods 25 adapted to be accommodated in the respective recesses 26 of the other half of the pneumatic channel coupling.

The pneumatic channel coupling is thus designed to perform different types of propulsion depending on the specific parameters of auxiliary equipment and containers (for instance, for operation of a pneumatic motor, for supplying air into inflatable tanks, for dosing or transportation of food products). For this purpose, the female parts of the pneumatic channel coupling may be located on the plurality of the containers to enable use of the compressed air for e.g. transportation of food products within the containers, mixing food products within the containers, or for dispensing food products from the containers.

Figure 6:
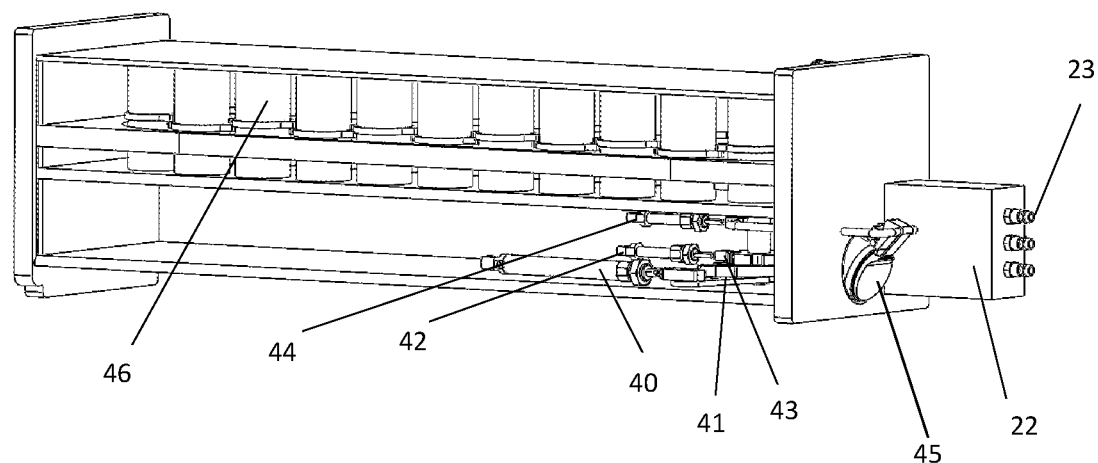
FIG. 6—a perspective view of an embodiment of a container containing a set of sealed cartridges with food products, adapted to be supplied by compressed air using the pneumatic channel coupling.

FIG. 6 shows one possible embodiment of a container containing a set of sealed cartridges 46 with food products, where the male part 20 of a pneumatic channel coupling on the end of arm tool couples the plurality of pneumatic receiving lines 23 on the female part 22 of a pneumatic channel coupling, performing one or more of the following functions by suppling compressed air: (a) pneumatic connection to a pneumatic cylinder 40 which ensures movement of a rachet wheel 41, which in turn causes movement of food cartridge belt; (b) pneumatic connection to a pneumatic cylinder 42, which locks the position of a star wheel 43; (c) pneumatic connection to a pneumatic cylinder 44 which performs function of closing a lid 45; (d) pneumatic connection to the cartridges 46, consecutively emptying their contents, or pushing out the cartridge 46.

Figure 7:
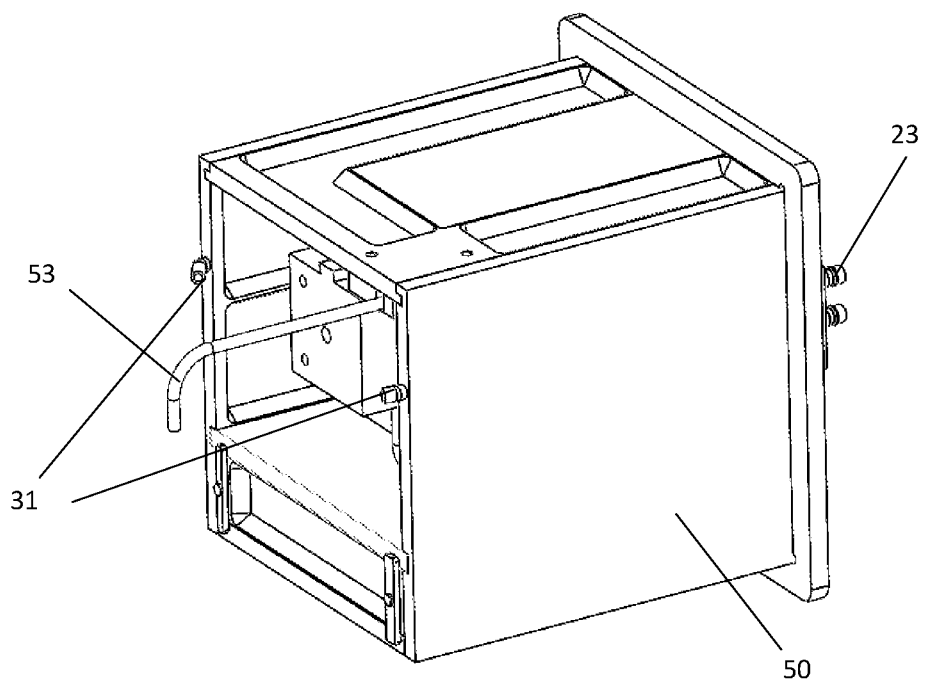
FIG. 7—a perspective view of another embodiment of a container with liquid or semi-liquid food products, adapted to be supplied by compressed air using the pneumatic channel coupling.

FIG. 7 shows another possible use of the pneumatic channel coupling, where the male part 20 of the pneumatic channel coupling on the end of arm tool couples the plurality of pneumatic receiving lines 23 on the female part of the pneumatic channel coupling, by suppling compressed air performing function of draining the residue of the supply channel 53 of the liquid or semi-liquid product dispenser 50 through nozzles 31 provided therefor, thus, dispensing an amount of the ingredient.

The invention claimed is:

1. An end of arm tool for a robotic cooking system, the end of arm tool comprising:
a rotary actuator, a flexible coupling having an engaging part, a linear actuator, and a gripper operably connected with the linear actuator and designed to releasably grip an object; the flexible coupling is operably connected with the rotary actuator and the engaging part of the flexible coupling is adapted to be releasably engaged with an engagement means of a plurality of containers for holding a supply of an ingredient, so that at the engaged position the rotation of the flexible coupling causes rotation of the engagement means of the plurality of containers; wherein the flexible coupling is designed to compensate misalignment and/or ensure easy entering of the engaging part of the flexible coupling to the engagement means of the plurality of containers; wherein the gripper comprising two rods, directly or indirectly associated with load cells, adapted to provide a representation of a load on the gripper; each rod is further provided with a ledge having one or more recesses, designed to accommodate the object gripped by the gripper; the rods are further provided with heads, designed to be engaged with cavities on the object; and
wherein the engaging part of the flexible coupling is provided with cogs or equivalent means to facilitate engagement with respective engaging surfaces of the engagement means of the plurality of containers, wherein the engaging part of the flexible coupling has a tip, which is substantially of truncated cone shape, or of truncated pyramid shape, where an angle between an imaginary longitudinal axis of symmetry of the flexible coupling and a slant surface of the tip is from 30 to 60 degrees.

2. An end of arm tool for a robotic cooking system, the end of arm tool comprising:
a rotary actuator, a flexible coupling having an engaging part, a linear actuator, and a gripper operably connected with the linear actuator and designed to releasably grip an object; the flexible coupling is operably connected with the rotary actuator and the engaging part of the flexible coupling is adapted to be releasably engaged with an engagement means of a plurality of containers for holding a supply of an ingredient, so that at the engaged position the rotation of the flexible coupling causes rotation of the engagement means of the plurality of containers; wherein the flexible coupling is designed to compensate misalignment and/or ensure easy entering of the engaging part of the flexible coupling to the engagement means of the plurality of containers; wherein the gripper comprising two rods, directly or indirectly associated with load cells, adapted to provide a representation of a load on the gripper; each rod is further provided with a ledge having one or more recesses, designed to accommodate the object gripped by the gripper; the rods are further provided with heads, designed to be engaged with cavities on the object; and
wherein the object gripped by the gripper is a tray and wherein the end of arm tool is further provided with one or more air nozzles directed so to create air flow along an inner surface of the tray to facilitate discharging food ingredients from the tray.

3. The end of arm tool according to claim 2, further comprising a male part of a pneumatic channel coupling, configured to supply compressed air, comprising a plurality of pneumatic supply lines; the pneumatic channel coupling configured to couple and uncouple a plurality of pneumatic receiving lines on a female part of the pneumatic channel coupling from the plurality of pneumatic supply lines on the male part, the pneumatic channel coupling including a plurality of supply line fittings configured to receive the plurality of pneumatic supply lines and a plurality of receiving line fittings configured to receive the plurality of pneumatic receiving lines.

4. An end of arm tool for a robotic cooking system, the end of arm tool comprising:
a rotary actuator, a flexible coupling having an engaging part, a linear actuator, and a gripper operably connected with the linear actuator and designed to releasably grip an object; the flexible coupling is operably connected with the rotary actuator and the engaging part of the flexible coupling is adapted to be releasably engaged with an engagement means of a plurality of containers for holding a supply of an ingredient, so that at the engaged position the rotation of the flexible coupling causes rotation of the engagement means of the plurality of containers; wherein the flexible coupling is designed to compensate misalignment and/or ensure easy entering of the engaging part of the flexible coupling to the engagement means of the plurality of containers; wherein the gripper comprising two rods, directly or indirectly associated with load cells, adapted to provide a representation of a load on the gripper; each rod is further provided with a ledge having one or more recesses, designed to accommodate the object gripped by the gripper; the rods are further provided with heads, designed to be engaged with cavities on the object; and
the end of arm tool further comprising a male part of a pneumatic channel coupling, configured to supply compressed air, comprising a plurality of pneumatic supply lines; the pneumatic channel coupling configured to couple and uncouple a plurality of pneumatic receiving lines on a female part of the pneumatic channel coupling from the plurality of pneumatic supply lines on the male part, the pneumatic channel coupling including a plurality of supply line fittings configured to receive the plurality of pneumatic supply lines and a plurality of receiving line fittings configured to receive the plurality of pneumatic receiving lines.

5. The end of arm tool according to claim 4, wherein the pneumatic supply lines of the male part of the pneumatic channel coupling are designed to be able to supply compressed air independently one from another.

6. The end of arm tool according to claim 4, wherein the male part of the pneumatic channel coupling further comprises a spring system, adapted to compensate some misalignment in the male and female parts of the pneumatic channel coupling during docking of the male and female parts of the pneumatic channel coupling; wherein the spring system comprises a base support and a spring system head, where the spring system head is pivotably mounted on the base support; springs provided between the base support and the spring system head, wherein the spring system head is pivotable about the base support and has six degrees of freedom.

7. The end of arm tool according to claim 4, wherein the pneumatic channel coupling further comprises one or more guiding rods adapted to be accommodated in respective recesses in the female part of the pneumatic channel coupling.

8. The end of arm tool according to claim 5, wherein the male part of the pneumatic channel coupling further comprises a spring system, adapted to compensate some misalignment in the male and female parts of the pneumatic channel coupling during docking of the male and female parts of the pneumatic channel coupling; wherein the spring system comprises a base support and a spring system head, where the spring system head is pivotably mounted on the base support; springs provided between the base support and the spring system head, wherein the spring system head is pivotable about the base support and has six degrees of freedom.

9. The end of arm tool according to claim 5, wherein the pneumatic channel coupling further comprises one or more guiding rods adapted to be accommodated in respective recesses in the female part of the pneumatic channel coupling.

\* \* \* \* \*